(12) United States Patent
Thilly et al.

(10) Patent No.: US 7,832,078 B2
(45) Date of Patent: Nov. 16, 2010

(54) PROCESS AND APPARATUS FOR PRODUCING A VIAL IN A STERILE ENVIRONMENT

(75) Inventors: Jacques Thilly, Rixensart (BE); Christian Vandecasserie, Rixensart (BE)

(73) Assignee: Aseptic Technologies S.A. (BE)

( * ) Notice: Subject to any disclaimer, the term of this patent is extended or adjusted under 35 U.S.C. 154(b) by 1216 days.

(21) Appl. No.: 10/563,275

(22) PCT Filed: Jul. 7, 2004

(86) PCT No.: PCT/EP2004/007503

§ 371 (c)(1),
(2), (4) Date: May 16, 2006

(87) PCT Pub. No.: WO2005/005128

PCT Pub. Date: Jan. 20, 2005

(65) Prior Publication Data

US 2006/0200968 A1     Sep. 14, 2006

(30) Foreign Application Priority Data

Jul. 8, 2003   (GB) ................... 0315953.0

(51) Int. Cl.
| | |
|---|---|
| B29C 45/00 | (2006.01) |
| B29C 70/80 | (2006.01) |
| B23P 21/00 | (2006.01) |
| B23Q 7/00 | (2006.01) |
| B65B 55/02 | (2006.01) |

(52) U.S. Cl. .................. 29/527.1; 29/559; 29/773; 29/801; 264/264; 264/328.1; 53/425

(58) Field of Classification Search ............... 29/428, 29/527.1, 559, 773, 801; 264/238, 268, 328.1; 53/425, 452; 604/415
See application file for complete search history.

(56) References Cited

U.S. PATENT DOCUMENTS

| | | | |
|---|---|---|---|
| 2,783,908 | A | 3/1957 | Winfield |
| 4,243,150 | A | 1/1981 | Gunne et al. |
| 4,275,511 | A | 6/1981 | Parkinson et al. |
| 4,783,056 | A * | 11/1988 | Abrams ................. 264/40.5 |
| 5,219,083 | A | 6/1993 | Liebert et al. |
| 5,687,542 | A | 11/1997 | Lawecki et al. ............ 53/122 |
| 6,065,270 | A | 5/2000 | Reinhard et al. ........... 53/426 |

(Continued)

FOREIGN PATENT DOCUMENTS

GB          450147          7/1936

(Continued)

OTHER PUBLICATIONS

Office action, Notice of Reasons for Rejection (English translation), JP 2006-518145, 4 pp. (Oct. 20, 2009).

(Continued)

*Primary Examiner*—Jermie E Cozart
(74) *Attorney, Agent, or Firm*—Klarquist Sparkman, LLP

(57) ABSTRACT

A process for making a medicinal vial in which a vial and a closure are moulded in parallel in respective vial and closure moulds, then the closure and vial are automatically assembled together, all in a sterile environment. An apparatus for performing this process is also provided. By the process and apparatus of the invention sealed vials with a sterile interior may be made.

23 Claims, 4 Drawing Sheets

U.S. PATENT DOCUMENTS

| | | |
|---|---|---|
| RE37,676 E | 4/2002 | Abrams et al. .............. 264/238 |
| 6,604,561 B2 | 8/2003 | Py |
| 6,695,829 B2 | 2/2004 | Hellstrom et al. |

FOREIGN PATENT DOCUMENTS

| | | |
|---|---|---|
| JP | 06-344367 | 12/1994 |
| JP | 08282789 | 10/1996 |
| JP | 2002-505980 | 2/2002 |
| JP | 2003-062037 | 3/2003 |
| WO | WO 99/45984 | 9/1999 |
| WO | WO2004/009323 | 1/2004 |

OTHER PUBLICATIONS

Office action from the Patent Office of the Russian Federation in Application No. 2007115540/06(016882), which is a National Stage filing from PCT/EP2005/011623 by Thilly, 3 pp. (Jun. 11, 2009).

* cited by examiner

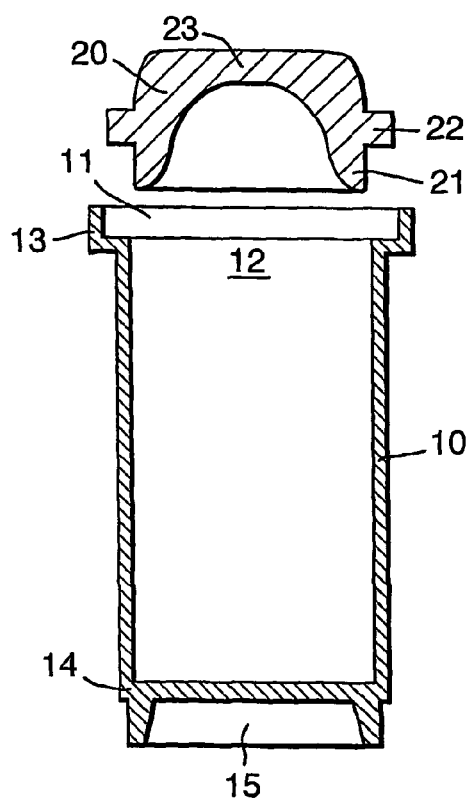
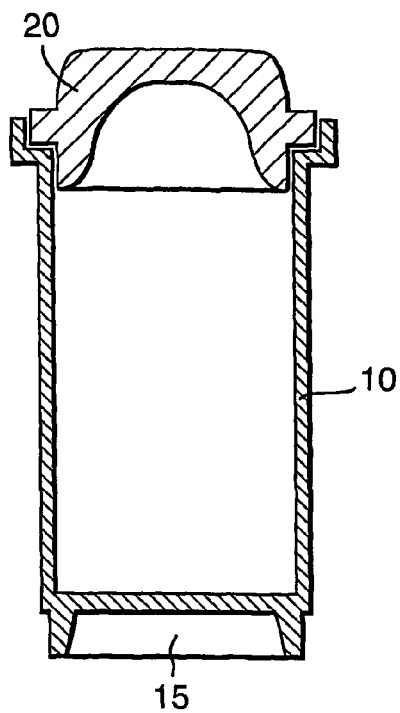
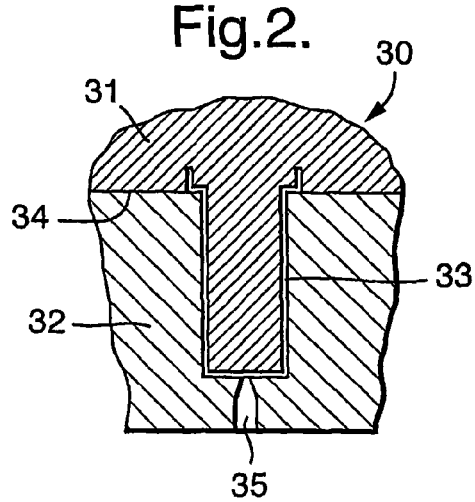
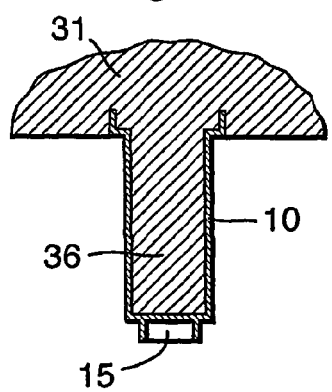
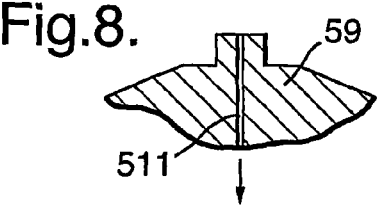

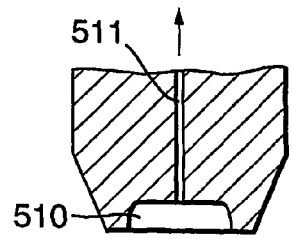
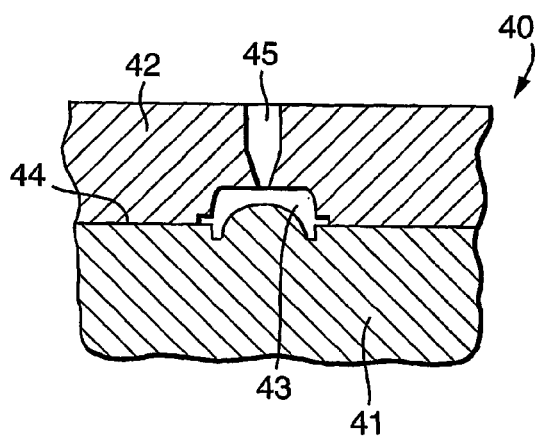
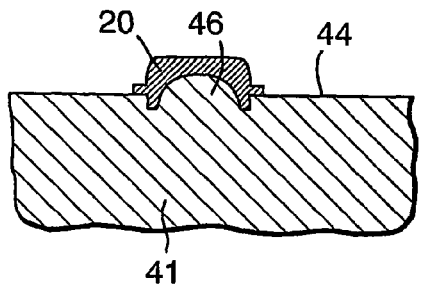
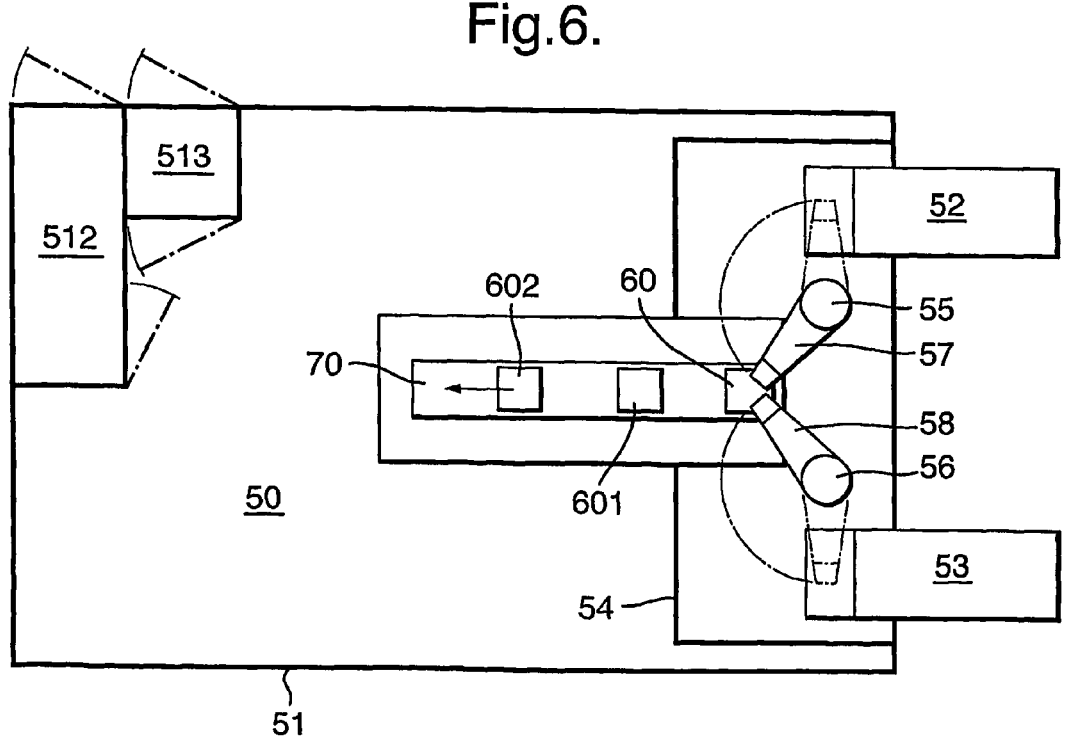

PROCESS AND APPARATUS FOR PRODUCING A VIAL IN A STERILE ENVIRONMENT

CROSS-REFERENCE TO RELATED APPLICATIONS

This application is a 371 of International Application No. PCT/EP2004/007503, filed 7 Jul. 2004.

This invention relates to a novel process for manufacturing medicinal vials. Medicinal vials are widely used for containing pharmaceutical product to be dispensed by injection. Pharmaceutical products include drugs and vaccines in a solid (e.g. lyophilised) or liquid (e.g. solution) state for either prevention or treatment of human and animal diseases and conditions, or diluent and reconstitution materials etc. Such vials usually comprise a vial body which may be made of a medically acceptable polymer, particularly a thermoplastic polymer, such as a cyclo-olefin copolymer ("COC"), blends thereof or blends thereof with other polymers. Examples of such polymers are for example disclosed in U.S. Pat. No. 5,723,189, EP-A-0436372 and EP-A-0556034 among others. A suitable hard plastic material accepted for use in the pharmaceutical industry is the cyclo-olefin copolymer "Topas" made by Celanese Corporation. The vial body normally has a mouth opening which is closed by a puncturable closure, generally made of an elastomer, many of which are known. Normally the pharmaceutical product content is extracted from the vial in a well known manner by passing a hollow injection needle through the puncturable closure.

BACKGROUND

A process is known from for example EP-A0678574 and WO-A-02/064439 in which an empty vial closed with a puncturable closure made of a thermoplastic elastomer ("TPE") is provided, pharmaceutical product content is introduced into the vial via a hollow needle passed through the closure, the needle is withdrawn from the vial and closure, and the residual puncture hole is sealed by heating the closure material around the puncture site for example with a laser beam. The closure part may for example be made of a blend of the polymers "Engage" supplied by Dupont-Dow, and "Dynaflex" formerly known as "Kraton" as supplied by Shell but now available from GLS (USA) who supply this blend, and including a dye, e.g. grey, to enhance absorption of laser light so that the elastomer material may be heated using laser light. With this process it is important for the interior of the vial body and at least the part of the closure in contact with the interior of the vial body to be in a sterile condition before the pharmaceutical product content is introduced. For use in this process empty vials with their closure in place may be sterilised by radiation directed at the vials and passing through the vial and closure material, but this radiation sterilising procedure introduces cost and complexity because of the need for a radiation source. Vials, closures and a vial-closure combination suitable for such a process are disclosed in WO-A-04/018317 (based upon GB 0219152.6 filed 16 Aug. 2002) the contents of which are incorporated herein by reference. WO-A-02/064439 discloses vial closures suitable for such a process having a lower infusible portion and a thermoplastic upper part which can be heat sealed e.g. with a focused laser.

The procedure of filling a sterilised container with a sterilised content within a sterilised environment is known in the art, e.g. by the FDA, as an "aseptic" process, i.e. performed under "aseptic" conditions. The term "sterilised" and derivative terms e.g. "sterile" used herein refers to a level of viable micro-organisms at or below a medicinally acceptable level as judged by conventional standards in the field.

BRIEF SUMMARY

It is an object of the present invention to provide a process by which a medicinal vial having its mouth closed by a puncturable closure and with its interior in a sterile condition may be made, suitable for use in the above described aseptic process. Other objects and advantages of the process of the invention will be apparent from the following disclosure.

According to this invention a process for making a medicinal vial comprises:

(1) providing a vial mould having an openable cavity therein defining the shape of a medicinal vial having a mouth opening, (2) moulding a vial in the vial mould cavity using a mouldable medicinally acceptable polymer, (3) opening the vial mould to expose the so-formed vial, (4) removing the so-formed vial body from the vial mould, (5) automatically inserting a sterile puncturable closure into the mouth opening of the so-formed vial body using automatic mechanical handling means, and wherein at least steps (3) to (5) are performed under sterile conditions.

A preferred embodiment of the process of the invention comprises:

(1) providing a vial mould having an openable cavity therein defining the shape of a medicinal vial having a mouth opening, (2) moulding a vial in the vial mould cavity using a mouldable medicinally acceptable polymer, (3) opening the vial mould to expose the so-formed vial, (4) removing the so-formed vial from the vial mould, (6) providing a closure mould having an openable cavity therein defining the shape of a puncturable closure for the mouth opening of the medicinal vial, (7) moulding a puncturable closure in the closure mould cavity using a mouldable medicinally acceptable elastomeric polymer, (8) opening the closure mould to expose the so-formed puncturable closure, (9) removing the so-formed puncturable closure from the closure mould, (5) automatically inserting the so-formed puncturable closure into the mouth opening of the so-formed vial, and wherein at least steps (3), (4), (5), (8) and (9) are performed under sterile conditions.

The invention also provides an apparatus for performing the above-described process. Such an apparatus may comprise:

(A) a vial mould having an openable cavity therein defining the shape of a medicinal vial having a mouth opening, and in which a vial may be moulded using a mouldable medicinally acceptable polymer, and which may be opened to expose a vial moulded therein, (B) a closure mould having an openable cavity therein defining the shape of a closure for a medicinal vial when moulded in the first mould, and in which a closure may be moulded using a mouldable medicinally acceptable polymer, and which may be opened to expose a closure moulded therein, (C) automatic mechanical handling means adapted to insert a puncturable closure made in the closure mould into the mouth opening of a vial made in the vial mould, (D) means to provide a sterile environment in relation to (A), (B) and (C) such that said vial and closure moulds may be opened, a respective vial and closure may be removed from the respective vial and closure moulds, and the closure inserted into a vial, in the sterile environment.

The process and apparatus of this invention addresses the above-mentioned problem by enabling the vial and a closure to be made by respective moulding processes from respective suitable polymers, such as those mentioned above, and then immediately or as soon as practical after manufacture enabling the closure to be inserted into the mouth of the vial under conditions which minimise the possibility of contamination of the vial and closure before insertion. In the process of the invention the vial is made and subsequently closed by the closure in a sterile environment without being transferred to a storage area between moulding and sealing, so there is no or very little opportunity for contamination of the vial before sealing.

In typical moulding processes a polymer, typically a thermoplastic polymer such as those mentioned above, conventionally supplied in a pellet form, is subjected to a high temperature to melt the polymer and is forced by high pressure into the mould, and the temperature and pressure conditions typically employed are generally sufficient to destroy any micro-organisms that might be contaminating the polymer and thereby sterilise the polymer.

The mould(s) for use in the process of the invention, i.e. the vial and closure moulds of the apparatus may either or both be an injection blow mould in which the vial or closure is moulded by gas pressure, typically from a so called pre-form. Injection blow moulding is more suitable for larger vials. Alternatively the vial and closure moulds may either or both be an injection mould in which initially solid polymer is fluidised by heat and pressure typically by a helical screw, and is then forced under pressure into the mould cavity. Such an injection mould may be a so called hot or cold runner mould, preferably a hot runner mould. The mould may be single or preferably multi cavity.

The shape of the so-formed vial and consequently the vial mould cavity should be designed so that the mould can be opened easily, i.e. without "overhangs". A suitable shape for the vial is an internally and preferably externally cylindrical tubular shape, with an open end defining a mouth opening, and an opposite closed end, with a flange externally around the mouth opening. An internally cylindrical shape enables the cylindrical interior of the vial to be defined by a corresponding cylindrical mandrel of the mould and from which the vial can be smoothly withdrawn to separate the so-formed vial from the mould. Externally the closed end of the vial may be formed with an engagement part for the automatic mechanical handling means, described in more detail following.

The closures may comprise a single elastomer, or alternatively they may be of the type disclosed in WO-A-02/064439 having a lower infusible portion and a thermoplastic upper part which can be heat sealed, and the closure mould may be configured to make closures of this type.

The moulding processes and general construction and operation of the moulds for making the vial and closure may be generally conventional, and it is preferred that the moulding equipment used is of a pharmaceutically acceptable, e.g. GMP, standard.

Suitable thermoplastic polymers for the vial are the above mentioned polymers. Using a COC or COC-based polymer cycle times of ca. 10-15 seconds can be achieved in the manufacture of a typical 2.5-100 ml capacity vial. For example the known COC polymer Topas 8007 may be used, available from for example Ticona GmbH (DE). Conditions for injection moulding this polymer are known in the art. Topas 8007 has a glass transition temperature of ca. 85° C. and if used it is preferred that the formed vial is ejected from the mould before it has cooled to below ca. 70° C. An alternative COC polymer is Topas 6015, and if this polymer is used it is preferred that the formed vial is ejected from the mould before it has cooled to below ca. 110-120° C. It is preferred not to use any mould release agent.

It is found that the cycle time for moulding of the elastomeric closures may be longer than that of the polymeric vials because the closures take longer to cool and harden because of among other reasons their greater wall thickness and lower thermal conductivity. Typically a cycle time of 15-20 seconds may be achieved. For this reason when vials and closures are made in simultaneous moulding processes the closure mould may be constructed to make multiples of the numbers of vials made by the vial mould. For example if the closures are allowed a moulding cycle time twice as long as the vials to allow them to cool sufficiently, then twice as many vials as closures may be made, e.g. two vial moulding cycles may be performed for every one closure moulding cycle.

The automatic insertion of the closure into the mouth opening of the vial in step (5) is preferably done as soon as practical after the vial and closure have been ejected from the mould and if necessary after performing any re-orientation of the vial and/or closure to facilitate the insertion. In the preferred embodiment of the process it is preferred that the process steps (7)-(9) in which a closure is made are performed in parallel with steps (2)-(4) in which the vial is made, so that the processes for making the vials and for making the closures are performed substantially simultaneously. In this way as soon as a vial has been made a closure is available to close it, and as soon as a closure has been made it is ready to be inserted into a vial. This facilitates the making of a vial and the making of a closure then immediately or very shortly after the vial and closure are in a suitable state to be engaged, e.g. when they have sufficiently hardened and/or cooled, inserting the closure into the vial mouth, and doing so whilst the vial and closure are in the sterile environment. For example closures may be engaged with the vials within 10-20 seconds of the vial mould being opened. Therefore the vial and closure can be made in a sterile state in their respective moulds in the moulding operation, and then engaged, all within a sterile environment.

As mentioned above the respective cycle times for moulding of vials and closures may be different, that of the closures generally being longer than that of the vials. To compensate for this the mould in which closures are made may comprise more, suitably twice the number, of cavities than the mould in which vials are made.

When the vial is of the above mentioned cylindrical shape with a cylindrical interior, when the vial mould is an injection mould, such a mould is preferably constructed such that when the vial mould is opened in step (3) the vial is retained, prior to ejection, on the vial mould by means of a cylindrical mandrel part of the vial mould extending into the cylindrical interior defied by the mandrel, and so that the so-formed vial may be ejected and removed in step (4) from the vial mould by sliding the vial off the mandrel part along the length axis direction of the cylinder. The vial and closure moulds provided in steps (1) and (6) for making the vial and closure suitably comprise an ejector means, which may be generally conventional, to eject the so formed vial or closure from the respective mould.

Preferably steps (4), (5) and (9) are performed by automatic handling means able to releasably engage with the vial and closure formed in the respective vial and closure moulds, to remove the formed vial and closure from their respective moulds, and to bring a vial and closure together to engage a vial with a closure. Preferably such automatic handling means is configured to releasably engage with plural vials and closures, to remove plural vials and closures from their moulds, and to bring plural vials and closures together to engage plural vials with plural closures simultaneously.

The automatic handling means may comprise a robot configured to releasably engage with the formed vial or closure, for example during or after ejection from the respective vial or closure mould, and to remove the same from the vicinity of the mould. For example the automatic handling machinery may comprise a robot arm moveable between a first position proximate to the mould and a second position distanced from the mould, the arm having vial or closure engaging means. Other types of robot may be used. Suitable robot machines are known or conventional, and it is preferred that such machines as used are of a pharmaceutically acceptable GMP standard. Robots provided by Stäubli AG (CH) are considered to be suitable, being available in a form qualified to work in Class 10 on silicon wafers in the electronics industry.

Preferably the automatic handling means, e.g. such a robot, e.g. by means of its arm, engages with the exterior of the closed end of the vial, i.e. being distant from the mouth opening to reduce the possibility of contamination of the interior of the vial, and also preferably engages with a part of the closure which will not be in contact with the interior of the vial when the closure is in place to thereby reduce the possibility of contamination of surfaces exposed to the interior of the vial.

Suitable means by which the automatic handling means, e.g. such a robot, may releasably engage with the vial or, closure will be apparent to those skilled in the art, for example gripping jaws. However it is preferred that the vial or closure engaging means comprises a suction means that draws the vial or closure into contact with the engaging means. A vacuum suction means complies with GMP and avoids complex mechanisms such as pinching fingers, and is easy to clean and maintain. For example the automatic handling means may engage with the engagement part at the exterior of the closed end of the vial. Analogous machinery may be used with the closure.

A suction means may engage with an external part of the vial, e.g. the engagement part of the moulded vial, and may hold the vial by such an engagement part. Similarly a suction means may engage with a part of the closure which does not come into contact with the interior of the vial when the closure is assembled with the vial. When engaged in this way the automatic handling means may remove the vial and closure from their respective vial and closure moulds.

In the preferred form of the process and apparatus of the invention handling means engaged with a closure can introduce the closure into a vial in step (5) whilst the vial is also engaged by handling means. The handling means may release the vial or the closure so that the engaged vial and closure may be retained by the handling means engaged with either the closure or vial, preferably with the closure so as to leave the engagement part of the vial unobstructed for subsequent engagement with further processing means. For this purpose the respective vial and closure moulding and automatic handling machinery may be positioned adjacent each other so that e.g. one handling robot can offer the closure to the vial being handled by another handling robot.

After the vial and closure have been assembled, i.e. the closure has been inserted into the mouth of the vial in step (5), the assembly of vial and closure may be transferred automatically, e.g. by automatic handling machinery, to a further processing station at which one or more further process may be performed on the assembly, preferably automatically and preferably also within the sterile environment.

A preferred further processing step is that of securing the closure to the vial using a clamp means, by engaging a suitable clamp means with the assembly of vial and closure. Conventionally closures are secured in place on the mouth of a vial by means of a clamp means that urges the closure against the rim of the vial mouth opening or against a flange surrounding the mouth opening. Such clamps may be made of metal, but it is preferred to use a clamp part made of plastics material, which may be engaged with the vial and closure by snap fitting, e.g. by a relative downward movement of the clamp part relative to the combination of vial and closure. The engaging of such a clamp part may be done whilst the combination of vial and closure are still in the sterile environment.

For example as disclosed in above-mentioned WO-A-04/018317 a clamp part may be engaged with the vial, particularly with the rim of the mouth opening, and able to bear upon the upper surface of the closure part to hold the closure part in a closing relationship with the mouth opening. Such a clamp part may, as disclosed in WO-A-04/018317 have an aperture therein through which a region of the upper surface of the closure part is exposed when the clamp part is engaged with the vial. A cover part as disclosed in above-mentioned WO-A-04/018317 may be engaged with the clamp part and/or the vial to cover the said region of the closure part, a lower surface of the cover part facing the upper surface of the closure part when so engaged. As disclosed in WO-A-04/018317 the cover part may have a sealing ridge projecting therefrom to a sealing edge that follows a closed perimeter, so that when the cover part is engaged with the clamp part and/or the vial the sealing edge engages with the closure part to form an enclosure with the closure part, at least that part of the cover part which includes the sealing ridge being removable from engagement with the clamp part and/or the vial.

This further processing may also be performed using automatic machinery, for example comprising a conveyor to transfer the assembly of vial and closure away from the point at which the closure is inserted into the vial mouth. An example of a suitable conveyor is disclosed in WO 04/026735.

Steps (3)-(5) and in the preferred form steps (3)-(5) and (8) and (9) are performed under sterile conditions, i.e. within the sterile environment of the apparatus. By "sterile" is meant complying with accepted standards in the pharmaceutical or vaccine industry for the filling of vials with medicinal contents for subsequent injection into a human patient. Generally sterile conditions are defined in terms of a classification e.g. Class 100 being more sterile, 10,000 being less sterile etc., but the term "sterile" as used herein refers to any acceptable standard of environmental purity as required by local standards. Such sterility may be achieved by the use of standard sterilisation techniques and operation in a purified air environment.

For example the respective vial and closure moulds may open, and the vial and closure may be assembled, within a sterile environment provided by a downward laminar air flow, typically class 100. (However the respective polymers for the vial and stopper may by fed into the respective moulding machines from outside of such an environment, the moulding conditions being suitable to sterilise the polymers). The automatic handling machinery of step (5) may operate entirely within the environment of this laminar airflow. When the vial and closure have been assembled so that the sterility of the interior is protected, the assembly may be transferred to a processing station for further processing as described above which is also in a sterile environment, but which may be of a lower degree of sterility to that in which the mould is opened and the vial and closure assembly assembled, for example class 10,000.

To maintain sterile conditions the mould and automatic handling machinery may for example be constructed and configured so that at all times during the procedure no part of the vial or closure is ever downstream in the sterile laminar airflow of any part of a mould or of the automatic handling machinery or any other equipment, so as to reduce the possibility of contamination being swept from the mould, machinery or other equipment onto the vial or closure. For example with a downward laminar flow the mould(s) may be configured to open in steps (3) and (8) along a horizontal axis, the automatic handling machinery may be configured to move a closure and vial together horizontally in step (5).

It may be unnecessary for the entire injection moulding machine, e.g. its polymer feed system, compression screw(s), heater etc. to be within a sterile environment, and this machinery may be located outside of the sterile environment, for example only the moulds and immediately adjacent parts of the machinery being within the sterile environment.

The invention also provides a combination of vial and closure when made by such a process.

Although the process disclosed herein is described in general terms it will be appreciated that all variations within this generally are encompassed within the scope of the present invention.

The process and apparatus of the invention will now be described by way of non-limiting example only with reference to the accompanying drawings.

BRIEF DESCRIPTION OF THE DRAWINGS

FIGS. 1A and 1B show a vial and closure in longitudinal section, assembled and unassembled.
FIG. 2 shows a vial mould for making a vial
FIG. 3 shows the vial mould of FIG. 2 opened.
FIG. 4 shows a closure mould for making a closure
FIG. 5 shows the closure mould of FIG. 4 opened.
FIG. 6 shows the layout of a facility for performing the process.
FIG. 8 shows a vacuum gripping means for a vial.
FIG. 9 shows a vacuum gripping means for a closure.

Figure 7:
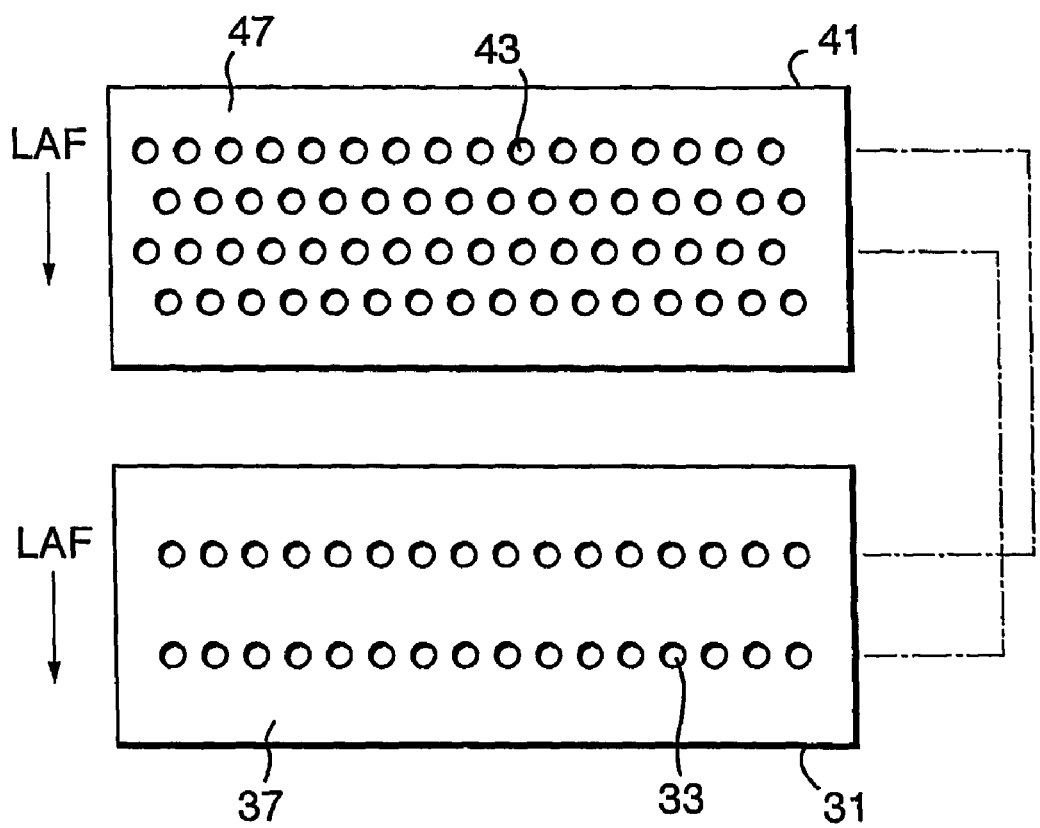
FIG. 7 shows the arrangement of mould cavities.

Parts referred to in FIGS. 1-12 and the related description are identified below.

DETAILED DESCRIPTION 10 vial
11 open end
12 mouth opening
13 flange
14 closed end
15 profiled outer bottom surface
20 elastomeric closure
21 lower plug part
22 flange
23 upper dome-shaped puncturable part
30 part of an injection mould
31,32 two mould blocks
33 cavity
34 split line
35 injection port
36 mandrel
37 surface
40 injection mould
41,42 mould blocks
43 cavity
45 injection port
46 mandrel
47 surface
50 sterile area
51 walls of sterile area
52,53 injection moulding machines
54 sub-area
55,56 automatic handling machinery
57, 58 robot arm
59, 510 vacuum handling
511 vacuum port
512, 513 airlocks
60 further processing station to fit clamp parts
601, 602 additional further processing stations
61 clamp part
62 snap fit teeth
63 snap fit groove
70 conveyor Referring to FIG. 1 a vial 10 and elastomeric closure 20 are shown in longitudinal section in both an unassembled (FIG. 1A) and assembled (FIG. 1B) configuration. For clarity the clearance between the closure 20 and vial 10 is shown exaggerated. The vial 10 is externally and internally of cylindrical tubular shape with an open end 11 defining a mouth opening 12 which is surrounded by a flange 13. The vial 10 has an opposite closed end 14, with a concave profiled outer bottom surface 15 comprising an engagement part for the automatic mechanical handling means described in more detail following. The vial 10 is made of a COC polymer and the closure 20 is made of a thermoplastic elastomer.

The closure 20 comprises a lower plug part 21 shaped and dimensioned to fit conformingly and tightly into mouth opening 12 of the vial 10, a flange 22 shaped and dimensioned to fit conformingly and tightly against flange 13, and an upper dome-shaped puncturable part 23. The closure 20 fits in place into the vial mouth 12 as shown in FIG. 1, and as secured by the clamp part 61 later described forms a tight micro-organism proof seal protecting the sterility of the interior of the vial 10.

FIG. 2 shows part of a vial mould being an injection mould 30 in which the vial 10 may be made. The mould 30 comprises two mould blocks 31, 32 between then defining a cavity 33 which is openable by splitting the mould at split line 34 and which defines the shape of the vial 10. There is an injection port 35 via which a fluid polymer such as COC or a COC-based polymer may be injected under appropriate temperature and pressure conditions known in the art for injection moulding of such polymers.

The vial mould 30 is a hot runner multi cavity mould typically comprising plural cavities 33. It is seen that the above-described shape of vial ensures that there are no "overhangs" obstructing removal of the formed vial 10 from the mould. FIG. 3 shows how when the vial 10 has been made in the mould 30 the mould 30 may be split at line 34, leaving the formed vial 10 retained upon the part 36 of the block 31 that comprises a cylindrical mandrel defining the cylindrical shape of the interior of the vial 10.

FIG. 4 shows part of a closure mould being an injection mould 40 in which the closure 20 may be made. The mould 40 comprises two mould blocks 41, 42 between then defining a cavity 43 which is openable by splitting the mould at split line 44 and which defines the shape of the vial 20. There is an injection port 45 via which a fluid elastomeric polymer may be injected under appropriate temperature and pressure conditions known in the art for such materials. The mould 40 is a hot runner multi cavity mould typically comprising plural cavities 43. It is seen that the above-described shape of closure 20 ensures that there are no "overhangs" obstructing removal of the formed vial 20 from the mould.

FIG. 5 shows how when the closure 20 has been made in the mould 40 the mould may be split at line 44, leaving the formed closure 20 retained upon the part 46 of the block 41 that comprises a mandrel defining the domed internal shape of the closure 20. Vial and closure moulds 30 and 40 also include conventional ejection machinery (not shown) to eject the formed vial 10 and closure 20 from the moulds 30, 40.

FIG. 6 shows schematically in plan the set up and operation of the moulds 30 and 40. A sterile area 50 maintained dynamically at class 10,000 is provided within the walls 51 of a clean room. Generally conventional injection moulding machines 52, 53 for respectively feeding the moulds 30, 40 for making the vials 10 and closure 20 are provided. These machines 52, 53 are hot runner machines and conventionally comprise a reservoir of polymer material (not shown) and a conventional screw extruder with conventional heating equipment etc. (not shown). These machines are constructed to pass through the wall 51 so that they can be driven, maintained and fed with polymer feed from outside of the area 50, with a sterile seal between the wall 51 and machines 52, 53. Each machine 52, 53 is constructed so that its respective mould 30, 40 opens in the manner described above within the area 50, and within a sub-area 54 which is maintained at class 100 by means of a downward sterile laminar airflow.

Each mould 30, 40 is set up so that it opens and closes horizontally at the respective line 34, 44, i.e. opening along an axis perpendicular to the surface 37, 47, such that the surface 37, 47 of each mould when open is in a vertical plane parallel to the sterile laminar airflow to reduce the possibility of any part of the mould 30, 40 being upstream in the laminar flow of air in area 54. Using a COC polymer in mould 30 and conventional injection moulding conditions a cycle time of ca. 10-15 seconds can be achieved in the manufacture of a typical 2.5-100 ml capacity vial 10. In the process of the invention both moulds 30 and 40 are operated in parallel, i.e. vials 10 and closures 20 are made simultaneously. The cycle time for making closures 20 is longer than the cycle time to make vials 10 because the relatively thick walled closures 20 take longer to cool. Consequently as shown in FIG. 7 the mould 40 in which the closures 20 are made comprises twice as many cavities 43, i.e. sixty-four cavities 43 arranged in four rows each of sixteen cavities 43 as does the mould 30 in which vials 10 are made, mould 30 comprising thirty-two cavities 33 arranged in two rows of sixteen cavities 33.

FIG. 7 shows how the cavities 33 and 43 in which respective vials 10 and closures 20 are made may be staggered in adjacent rows. The cavities 33, 43 are arranged in a pattern such that the arrangement of rows of vial cavities 33 correspond to the arrangement of alternate rows of closure cavities 43. By such an arrangement all of the vials 10 may be removed from the mould 37 simultaneously by plural correspondingly arranged handling machinery 59 whilst maintaining the pattern of the vials 10, and all of the closures 20 may be removed from the mould 47 simultaneously by plural correspondingly arranged handling machinery 510 whilst maintaining the pattern of the vials 20. The plural closures 20 may then be mated with vials 10 whilst maintaining the corresponding pattern of vials 10 and closures 20. As explained above because of the longer cycle time of the closures 20 than of the vials 10, the mould 37 may be passed through two moulding cycles, i.e. used twice to make vials 10 as described above whilst one mould 47 is used to make the same number of closures 20 as is needed by these two moulds full of vials 10.

Within the area 50 and operating within sub-area 54 automatic handling machinery 55, 56 is provided. Each machine 55, 56 comprises a robot arm 57, 58 which is capable of being moved into a first position shown in dashed lines adjacent to a respective mould 30, 40 when the mould 30, 40 is open. Each robot arm 57, 58 has at its extremity one or more vacuum handling means 59, 510 as shown in FIGS. 8 and 9 of a shape complementary to and able to engage by suction with a surface of respectively the vial 10 and closure 20 which when the vial and closure are assembled as shown in FIG. 1 will not be in contact with the interior of vial 10. In the case of vial 10 this surface is the outer concave bottom 15 of the vial, and in the case of the closure 20 this surface is the outside of the dome 23. Each vacuum handling means 59, 510 includes a vacuum port 511 through which vacuum may be applied. As each arm 57, 58 is moved adjacent to the respective mould 30, 40 the arm 57, 58 contacts the said surface of the vial 10 or closure 20, the vacuum handling means 59, 510 engages the vial 10 or closure 20. The ejection machinery (not shown) associated with each mould may then be operated to thereby remove the formed vial and closure from the respective mould 30, 40.

Then the arm 57, 58 is moved away from the respective mould 30, 40 to thereby carry the formed vial 10 and closure 20 from the respective vial and closure mould 30, 40.

Figure 10:
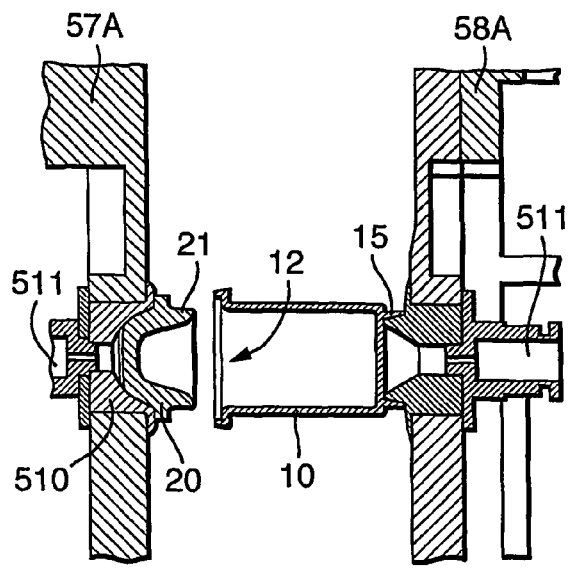
FIG. 10 shows mechanical handling means assembling the vial and closure.

Each robot arm 57, 58 then moves to a second position shown in full lines in FIG. 6 at which the respective vacuum handling means 59, 510 and the respective vial 10 and closure 20 are adjacent to each other. FIG. 10 shows this operation of the handling means 59, 510 in more detail. The vacuum handling means 59 engaged with the engagement part 15 of vial 10, and the vacuum handling means 510 engaged with the closure 20 are relatively moved until the lower plug part 21 is adjacent to and coaxial with the mouth 12 of vial 10. Then the vial 10 and closure 20 are moved together to insert the closure 20 into the mouth 12 of vial 10. This insertion operation is performed within the sub-area 54. It is seen in FIG. 10 how the means 59, 510 may be made as sub-assemblies which can be engaged with the extremities 57A, 58A of the robot arms 57, 58.

Using multi-cavity moulds 30, 40 as shown in FIG. 5, plural handling means 510 are used to remove thirty-two formed closures 30 from mould 40 and to insert them into thirty-two corresponding vials 10 formed in mould 30 as described above. As the respective closures 20 and vials 10 have corresponding arrangements in rows in respective moulds 30, 40 two alternate rows of closures 20 may be simultaneously removed from mould 40 as shown in FIG. 7 whilst maintaining the arrangement of the closures 20, and inserted into corresponding vials 10.

When all of the vials 20 have been removed from mould 30 the mould 30 is closed to re-form the arrangement shown in FIG. 2, a further thirty-two vials 10 are made by injection moulding, the mould 30 is opened, and the procedure of inserting closures 20 into these vials as described above is repeated using the remaining alternate rows of thirty-two closures 20 in mould 40. When all of the sixty-four closures 20 have been removed from mould 40 the mould 40 is closed to re-form the arrangement shown in FIG. 4 and a further sixty-four closures are made as described above.

Figure 11:
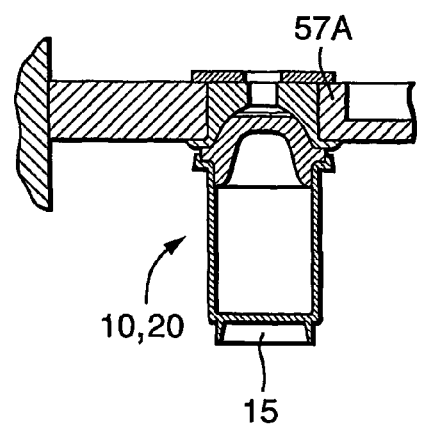
FIG. 11 shows handling of the assembly of vial and closure

As seen in FIG. 11 the handling means 59 which engages the formed vial 10 then releases the vial 10 so that the assembly of vial and closure 10, 20 is held by the handling means 510 which holds the closure 20, so that this assembly can be further manipulated and transferred to a further processing station whilst held in this manner by the robot arm 57A.

After the vial 10 and closure 20 have been assembled as described above, the assembly of vial 10 and closure 20 may be transferred to a further processing station 60. The vial and closure combination 10,20 may be re-oriented by the handling machinery 57,58 into a vertical orientation. The holding of the assembly 10,20 by the closure 20 in the manner shown in FIG. 11 causes the engagement part 15 of the vial 10 to be unobstructed so that the engagement part 15 of the vial 10 may be engaged with a corresponding engagement part (not shown) of further processing machinery 60. Such further processing machinery may comprise a conveyor 70, which may be of the type disclosed in WO-A-04/026735, in which the part 25 shown therein can engage with the engagement part 15 of vial 10, which is then held down on the conveyor by part 30 shown therein. When the assembly 10, 20 is held in this manner on such a conveyor 70 the assembly is secure for further processing.

Figure 12:
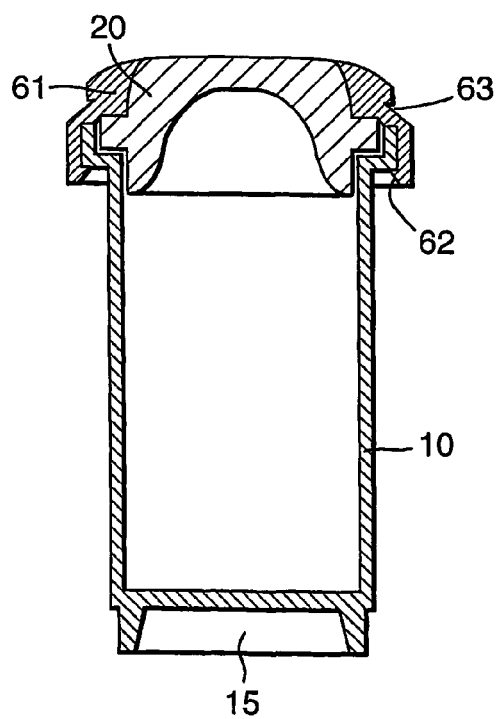
FIG. 12 shows a clamp means fitted to a combination of vial and closure.

This further processing station 60 may be a station at which a clamp part 61, e.g. as disclosed in WO-A-04/018317 may be fitted onto the assembly 10,20 to hold the closure 20 in place may be fitted onto the assembly of vial 10 and closure 20. FIG. 12 shows a combination of a vial 10 with a closure 20 in its mouth opening, with a clamp part 61 of the type disclosed in WO-A-04/018317. The clamp part 61 comprises a resilient plastics material generally ring-shaped member, having snap fit engagement teeth 62 configured to snap resiliently underneath the flange 13 around mouth opening 12 of the vial 10 when moved relatively downwardly over the flange 13, and to hold the upper part of the clamp part firmly downwards against the closure 20. Clamp part 61 also includes a groove 63 by which a cover part (not shown) of the type disclosed in WO-A-04/018317 may be engaged with the clamp means 61. The further processing station is shown within the sub-area 54 but may be outside, e.g. in the area 50 as the vial 10 is now closed by the closure 20.

After the clamp part 61 has been engaged with the combination of vial 10 and closure 20, these may be transferred by conveyor system 70 by means of which the vials are transferred away from the robots 55, 56 for any further processing, e.g. at further processing stations 601, 602 which may be respectively a vial filling station and a vial sealing station.

Automatic handling machinery 55, 56, 57, 58 etc. may be generally conventional and suitable machinery will be apparent to those skilled in the art. Although shown as swinging robot arms 55, 56 other types and motions of robot arm may be used, such as X-Y-Z axis pick and place robots. In the construction and arrangement of the moulds 30, 40 and the robot arms 55, 56 it is important that that at no time does any part of the mould 30, 40 or arms 55, 56 become upstream, in a flow of sterile air, of the vial or closure made or handled thereby, to avoid any possibility of contamination of vial-closure assemblies by particles carried by the laminar airflow from the mould 30, 40 or arm 55, 56 toward the respective vial or closure.

It will be understood that the sterile areas 50 and 54 enable the above process to be performed under sterile conditions, and to maintain sterile conditions in area 50 operator and material access to area 50 may be via airlocks 512, 513. By making both the vial 10 and closure 20 in these moulding processes the polymers used are subjected to a high temperature and high pressure which destroy any micro-organisms that might be contaminating the polymer. As the vial 10 is sealed with closure 20 immediately after manufacture, in a sterile environment 54 there is no or very little opportunity for contamination of the vial before sealing.

The invention claimed is:

1. A process for making a medicinal vial comprising:
    (1) providing a vial mould having an openable cavity therein defining the shape of a medicinal vial having a mouth opening,
    (2) moulding a vial in the vial mould cavity using a mouldable medicinally acceptable polymer,
    (3) opening the vial mould to expose the vial,
    (4) removing the vial from the vial mould,
    (5) providing a closure mould having an openable cavity therein defining the shape of a puncturable closure for the mouth opening of the medicinal vial,
    (6) moulding a puncturable closure in the closure mould cavity using a mouldable medicinally acceptable elastomeric polymer,
    (7) opening the closure mould to expose the puncturable closure,
    (8) removing the puncturable closure from the closure mould,
    (9) automatically inserting the puncturable closure into the mouth opening of the vial,
    and wherein at least steps (3), (4), (7), (8) and (9) are performed under sterile conditions.

2. A process according to claim 1 wherein the vial and puncturable closure are either or both made by an injection moulding process in which initially solid polymer is fluidised by heat and pressure typically by a helical screw, and is then forced under pressure into the mould cavity.

3. A process according to claim 1 wherein the vial mould cavity is shaped to make a vial having an internally cylindrical tubular shape, with an open end defining a mouth opening, and an opposite closed end, with a flange externally around the mouth opening.

4. A process according to claim 1 wherein the vial mould cavity is shaped to make a vial having a closed end with an engagement part suitable for engagement with automatic mechanical handling means.

5. A process according to claim 1 wherein a cyclo-olefin thermoplastic polymer is used to make the vial.

6. A process according to claim 1 wherein the closure mould is constructed to make multiples of the numbers of vials made by the vial mould.

7. A process according to claim 1 wherein steps (4), (8) and (9) are performed by automatic handling means able to releasably engage with the vial and puncturable closure formed in the respective vial and closure moulds, to remove the formed vial and puncturable closure from their moulds, and to bring a vial and closure together to engage a vial with a puncturable closure.

8. A process according to claim 7 wherein the automatic handling means is configured to releasably engage with plural vials and puncturable closures, to remove plural vials and puncturable closures from their moulds, and to bring plural vials and puncturable closures together to engage plural vials with plural puncturable closures simultaneously.

9. A process according to claim 7 wherein the automatic handling means engages with the exterior of the closed end of the vial, and engages with a part of the puncturable closure which will not be in contact with the interior of the vial when the puncturable closure is in place.

10. A process according to claim 7 wherein the automatic handling means releasably engages with the vial or puncturable closure by a suction means that draws the vial or puncturable closure into contact with engaging means of the automatic handling means.

11. A process according to claim 7 wherein the handling means engaged with a puncturable closure introduces the puncturable closure into a vial in step (9) whilst the vial is also engaged by handling means.

12. A process according to claim 11 wherein the handling means releases the vial so that the engaged vial and puncturable closure is retained by the handling means engaged with the puncturable closure.

13. A process according to claim 1 wherein after the assembly of vial and puncturable closure in step (9) the assembly is transferred automatically to a further processing station at which one or more further process is performed on the assembly.

14. Apparatus for performing a process for making a medicinal vial comprising:
   (A) a vial mould having an openable cavity therein defining the shape of a medicinal vial having a mouth opening, and in which a vial may be moulded using a mouldable medicinally acceptable polymer, and which may be opened to expose a vial moulded therein,
   (B) a closure mould having an openable cavity therein defining the shape of a closure for a medicinal vial when moulded in the first mould, and in which a closure may be moulded using a mouldable medicinally acceptable polymer, and which may be opened to expose a closure moulded therein,
   (C) automatic mechanical handling means adapted to insert a puncturable closure made in the closure mould into the mouth opening of a vial made in the vial mould,
   (D) sterilization means to provide a sterile environment in relation to (A), (B) and (C) such that said vial and closure moulds may be opened, a respective vial and closure may be removed from the respective vial and closure moulds, and the closure inserted into a vial, in the sterile environment.

15. Apparatus according to claim 14 wherein the vial and closure moulds are both or either injection moulds in which initially solid polymer is fluidised by heat and pressure typically by a helical screw, and is then forced under pressure into the mould cavity.

16. Apparatus according to claim 14 wherein the vial mould cavity is shaped to make a vial having a closed end with an engagement part suitable for engagement with automatic mechanical handling means.

17. Apparatus according to claim 14 wherein the closure mould is constructed to make multiples of the numbers of vials made by the vial mould.

18. Apparatus according to claim 14 provided with automatic handling means able to releasably engage with the vial and closure formed in the respective vial and closure moulds, to remove the formed vial and closure from their moulds, and to bring a vial and closure together to engage a vial with a closure, to insert the closure into the mouth opening of the vial.

19. Apparatus according to claim 18 wherein the automatic handling means is configured to releasably engage with plural vials and closures, to remove plural vials and closures from their moulds, and to bring plural vials and closures together to engage plural vials with plural closures simultaneously.

20. Apparatus according to claim 18 wherein the automatic handling means is configured to engage with the exterior of the closed end of the vial, and to engage with a part of the closure which will not be in contact with the interior of the vial when the closure is in place.

21. Apparatus according to claim 18 wherein the automatic handling means is configured to releasably engage with the vial or closure by a suction means that draws the vial or closure into contact with engaging means of the automatic handling means.

22. Apparatus according to claim 18 wherein the handling means is configured to introduce a closure engaged by the handling means into a vial whilst the vial is also engaged by handling means.

23. Apparatus according to claim 22 wherein the handling means is configured to release the vial so that the engaged vial and closure is retained by the handling means engaged with the closure.

* * * * *